US012758000B2

(12) United States Patent
Feliciano et al.

(10) Patent No.: US 12,758,000 B2
(45) Date of Patent: Oct. 13, 2026

(54) MODULATION OF COLORING FORMULATION COMPONENTS FOR HAIR COLORING DEVICE

(71) Applicant: L'Oreal, Paris (FR)

(72) Inventors: Rafael Feliciano, New Providence, NJ (US); Heba S. Said, Old Bridge, NJ (US); Hyosik Dennis Min, Palisades Park, NJ (US)

(73) Assignee: L'Oreal, Paris (FR)

( * ) Notice: Subject to any disclaimer, the term of this patent is extended or adjusted under 35 U.S.C. 154(b) by 384 days.

(21) Appl. No.: 18/501,469

(22) Filed: Nov. 3, 2023

(65) Prior Publication Data

US 2025/0143437 A1 May 8, 2025

(51) Int. Cl.

| | |
|---|---|
| ***A45D 44/00*** | (2006.01) |
| ***A45D 19/00*** | (2006.01) |
| ***G06Q 30/0601*** | (2023.01) |
| ***G06T 7/40*** | (2017.01) |
| ***G06T 7/60*** | (2017.01) |
| ***G06T 7/90*** | (2017.01) |

(52) U.S. Cl.

CPC ....... *A45D 44/005* (2013.01); *A45D 19/0066* (2021.01); *G06Q 30/0621* (2013.01); *G06Q 30/0631* (2013.01); *G06T 7/40* (2013.01); *G06T 7/60* (2013.01); *G06T 7/90* (2017.01); *A45D 2044/007* (2013.01); *G06T 2207/20081* (2013.01); *G06T 2207/30196* (2013.01)

(58) Field of Classification Search

CPC .................................................... A45D 44/005

See application file for complete search history.

(56) References Cited

U.S. PATENT DOCUMENTS

| | | | | |
|---|---|---|---|---|
| 11,470,940 | B2 | 10/2022 | Grez et al. | |
| 2018/0125207 | A1* | 5/2018 | Shami .................. | G01N 21/251 |
| 2019/0035163 | A1* | 1/2019 | Skwarek .............. | G06V 40/165 |

(Continued)

FOREIGN PATENT DOCUMENTS

| | | | | |
|---|---|---|---|---|
| WO | WO-2018114455 | A1 * | 6/2018 | ......... G06Q 30/0643 |
| WO | 2019222327 | A1 | 11/2019 | |
| WO | WO-2022090152 | A1 * | 5/2022 | ........... A45D 44/005 |

OTHER PUBLICATIONS

International Search Report and Written Opinion mailed Dec. 16, 2024, issued in corresponding International Application No. PCT/US2024/051627, filed Oct. 16, 2024, 16 pages.

(Continued)

*Primary Examiner* — Jeff Zimmerman

(74) *Attorney, Agent, or Firm* — Christensen O'Connor Johnson Kindness PLLC

(57) ABSTRACT

A computer system obtains digital image data of hair of a live subject; provides the digital image data to a style recommendation engine of the computer system; determines, by the style recommendation engine of the computer system, color of the hair of the live subject based on the digital image data; and executes a machine learning model of the style recommendation engine using the color of the hair of the live subject as input to generate a style profile as output. The style profile comprises parameters configured to control discharge of one or more components of a hair coloring formulation by a formulation dispensing system of a hair coloring device.

20 Claims, 4 Drawing Sheets

(56) References Cited

U.S. PATENT DOCUMENTS

| | | | | |
|---|---|---|---|---|
| 2021/0127811 | A1* | 5/2021 | Puls | A45D 44/005 |
| 2022/0005189 | A1* | 1/2022 | Perrot | G06T 7/0012 |
| 2022/0164852 | A1* | 5/2022 | Punyani | G06V 10/82 |
| 2022/0225747 | A1* | 7/2022 | Brown | B01F 33/8442 |
| 2023/0210245 | A1* | 7/2023 | Lee | A45D 34/04 132/200 |
| 2023/0232965 | A1* | 7/2023 | Xing | A45D 44/005 132/212 |
| 2023/0240422 | A1* | 8/2023 | Akerele | A45D 19/026 132/112 |

OTHER PUBLICATIONS

Song, V., "L'Oreal's newest gadget takes the mess out of coloring your hair", The Verge, Jan. 3, 2022, 7 pages.

Search Report and Written Opinion received May 28, 2024, issued in corresponding French Application No. 2315346, filed Dec. 27, 2023, 9 pages.

* cited by examiner

MODULATION OF COLORING FORMULATION COMPONENTS FOR HAIR COLORING DEVICE

SUMMARY

In one aspect, a computer system obtains digital image data of hair of a live subject; provides the digital image data to a style recommendation engine of the computer system; determines, by the style recommendation engine of the computer system, color of the hair of the live subject based on the digital image data; and executes a machine learning model of the style recommendation engine using the color of the hair of the live subject as input to generate a style profile as output. The style profile comprises parameters configured to control discharge of one or more components of a hair coloring formulation by a formulation dispensing system of a hair coloring device.

In an embodiment, the style profile generated by the machine learning model further comprises a pattern of hair coloring, and the parameters are further configured to modulate discharge of the one or more components to color the hair of the live subject according to the pattern.

In an embodiment, the style profile generated by the machine learning model further comprises one or more custom components (e.g., dyes or developer) of the hair coloring formulation.

In an embodiment, the computer system determines length or texture of the hair of the live subject, and the executing of the machine learning model uses the length or texture of the hair as additional input to generate the style profile as output.

In an embodiment, the computer system obtains environmental data associated with the environment of the live subject (e.g., temperature data, humidity data, or a combination thereof), and the executing of the machine learning model uses the environmental data as additional input to generate the style profile as output.

In an embodiment, the computer system obtains sensor information from the hair coloring device during a hair coloring operation and modifies the discharge of one or more of the components based on the sensor information. In an illustrative scenario, the sensor information comprises position sensor data, and the modification of the discharge of the component(s) includes calculating, based on the position sensor data, a position of the hair coloring device relative to the hair of the live subject, and modifying the discharge of the component(s) based on the calculated position.

In another aspect, a hair coloring device comprises a formulation dispensing system and computation circuitry configured to receive a style profile comprising parameters configured to control discharge of one or more components of a hair coloring formulation by the formulation dispensing system; and operate the formulation dispensing system according to the style profile. The style profile is generated as output of a machine learning model of a style recommendation engine. In an embodiment, the computational circuitry is further configured to obtain sensor information from the one or more sensors during a hair coloring operation; and modulate the discharge of the one or more components of the hair coloring formulation based on the sensor information.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
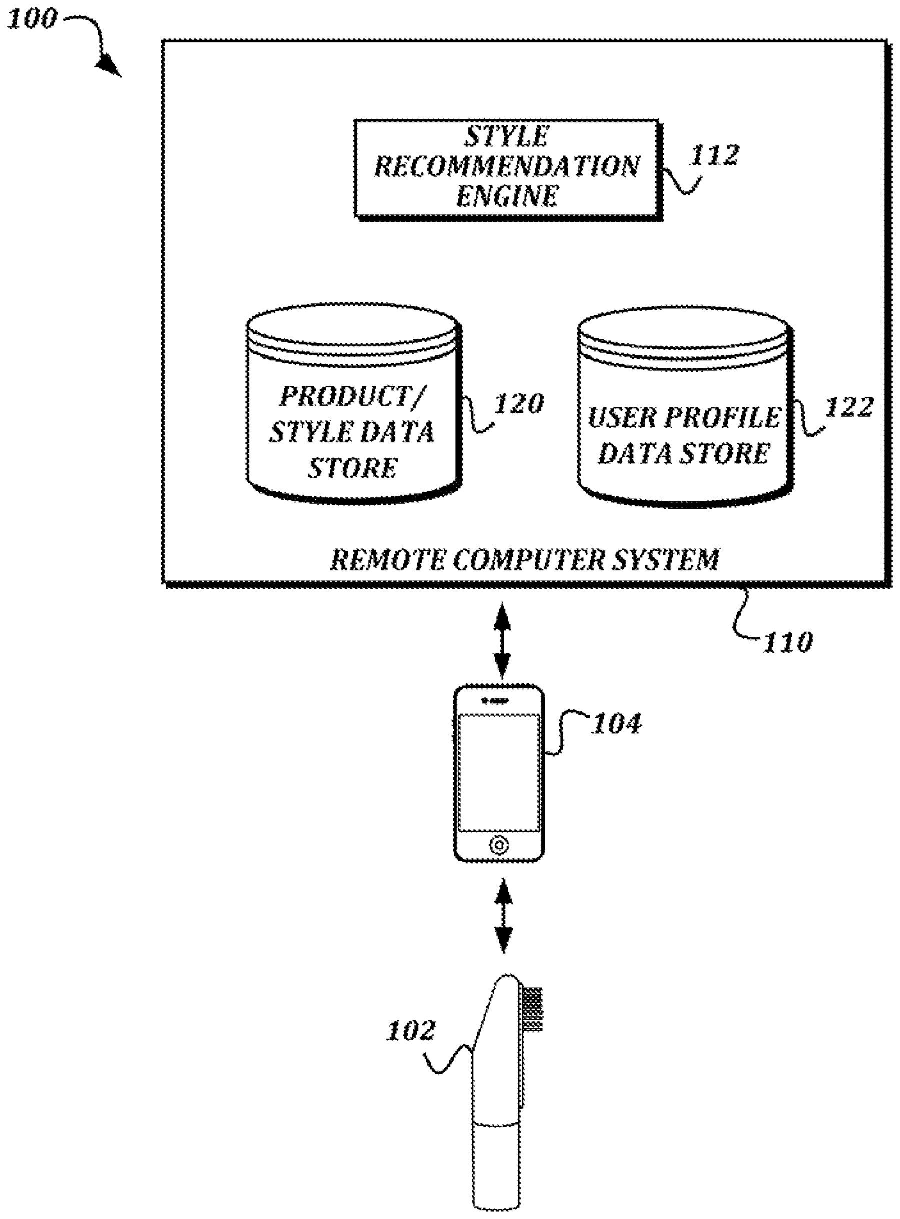
FIG. 1 is a block diagram that illustrates a system in which various aspects of the present disclosure may be implemented.

Hair coloring formulations typically include at least one dye and a separate developer, which must be mixed in controlled proportions, and applied in a precise manner, for effective and predictable hair coloring results. Typically, this requires a professional colorist to assess the characteristics of the user's hair and prepare and apply a corresponding hair coloring formulation to desired areas of the user's hair. At-home hair coloring kits have long been used by consumers for convenience or cost savings, but at-home kits have many disadvantages. As one example, once an at-home kit is selected and put into use, the consumer is unable to make any adjustments to the formulation or application technique based on hair color or other hair characteristics, or environmental conditions. Additionally, hair coloring techniques such as ombre or balayage are difficult to achieve with at-home kits, as they typically require precise application patterns and techniques.

Embodiments described herein provide technical solutions to one or more of the technical problems described above, or other technical problems.

In embodiments disclosed herein, a software system designed for use with a hand-held hair coloring device is configured to capture image data of a user's hair; recommend styles based on the captured image data, and transmit parameters of a recommended style to the hair coloring device, which is configured to color the user's hair according to the specified parameters. In an embodiment, the recommended styles include hair dying colors or patterns to be applied to some or all of the user's hair, such as highlights, ombre, balayage, or other styles or patterns. In an embodiment, the recommendation includes information relating to the coloring itself, such as a coloring component mixture ratio.

In various embodiments, the recommended style is generated by a machine learning module. In an embodiment, the machine learning module takes hair characteristics (e.g., color, length, texture, porosity, etc.) as input and generates a recommended style (e.g., dye color, pattern) as output.

In an embodiment, the output of the machine learning module further includes device configuration or control information. In an illustrative scenario, the machine learning module generates a recommended style that includes a recommended pattern and color, along with corresponding hair coloring device configuration and control information. In such a scenario, corresponding device configuration and control information provided by the software system can include one or more varying parameters to modulate dye loads or other aspects of a coloring formulation, such as variable flow rates to gradually alter the amount or composition of coloring formulations applied to the hair as the hair coloring device moves through the user's hair. For example, in balayage styling, the hair is treated to generate a gradient effect, with the hair gradually changing from one color to another along its length. In this example, the software system can provide varying parameters to gradually increase or decrease dye loads to achieve the desired gradient effect.

Device configuration and control information can be used in combination with a user interface to guide the user of the hair coloring device during operation. In an illustrative scenario, the user interface is presented on a computing device such as a smartphone and includes a graphical element such as a progress bar to guide the user to move the hair coloring device in a particular direction and at a particular speed. When combined with device configuration and control information that regulates parameters such as flow rate or mixture ratio, the user interface can help ensure that the hair coloring is applied in particular locations and amounts to achieve the desired styling effect.

In various embodiments, the recommended style is based on one or more factors. In an embodiment, the recommended style is generated based on qualities of the user's hair (e.g., length, texture, color, quality, etc.). In an embodiment, the recommended style is based on other factors such as trending styles, geographic region, user preferences, or the like. In an embodiment, the recommended style includes additional recommendations beyond color or patterns, such as hair treatments (e.g., use of a leave-in conditioner or hair mask).

In an embodiment, the software system includes a module configured to run a diagnostic test to determine how a user's hair will respond to the recommended style or treatment. In one illustrative scenario, the software system obtains image data or other data of a user's hair to determine hair quality, texture, color, length, porosity, or other factors which are used to inform the recommended style. In an embodiment, one or more test strands are analyzed to determine characteristics such as size, texture, porosity, or the like.

In an embodiment, the software system includes functionality for providing related information (such as alerts or updates) to a user or obtaining information (such as user preferences, style ratings, or questionnaire answers) from the user. In an illustrative scenario, the software system issues alerts such as "touch-up" reminders to re-apply a formulation to maintain a recommended style, or environment alerts to inform the user of environmental conditions that may adversely affect color-treated hair, such as high humidity or high temperatures. In an embodiment, the software system accepts user feedback after coloring has been applied, and updates future style recommendations accordingly.

In an embodiment, the software system includes functionality for providing a style customization profile to a hair coloring device from another computing device, such as by transmitting the profile from a smartphone or other computing device to the hair coloring device via a wireless connection such as a Bluetooth®, near-field communication (NFC), or Wi-Fi connection.

In an embodiment, the hair coloring device includes onboard sensors (e.g., cameras, inertial measurement units, gyroscopes, accelerometers, proximity sensors, humidity sensors, temperature sensors, or the like) configured to gather information on the movement, orientation, or status of the hair coloring device, the condition of the user's hair or scalp, or status of a hair coloring operation. Such information can be used to modulate parameters such as fluid flow rate or oscillation speed while the device is in use, or to generate alerts or notifications to be presented to the user (e.g., via a smartphone or the hair coloring device itself), such as to guide the user to change the orientation of the hair coloring device, move at a faster or slower speed, or to make some other modification.

FIG. 1 is a block diagram that illustrates a system in which various aspects of the present disclosure may be implemented. As shown in FIG. 1, system 100 includes hair coloring device 102 with wireless communication circuitry. Hair coloring device 102 may send and/or receive information (e.g., usage data, device identification/configuration data, environmental data, or the like) to and/or from remote computer system 110, either directly or via one or more intermediary devices such as client computing device 104, as described below.

In the illustrative arrangement depicted in FIG. 1, client computing device 104 connects to remote computer system 110, which may generate custom content for a user, such as product recommendations, style recommendations, or settings or parameters for operation of hair coloring device 102. In an embodiment, a style recommendation for hair coloring device 102 includes a defined pattern of hair to be colored during the routine, time durations for each area, oscillation speeds, hair coloring formulation components, mixture ratios, or the like. In an embodiment, custom routines or device settings may be uploaded to client computing device 104 for subsequent transmission to hair coloring device 102. Hair coloring device 102, client computing device 104, or remote computer system 110 may also include or communicate with environmental sensors and/or other computing devices. Illustrative modules of hair coloring device 102, client computing device 104, and remote computer system 110 are described below.

Client computing device 104 may be used by a consumer, hair care professional, or other entities to interact with other components of the system 100, such as remote computer system 110 or hair coloring device 102. In an embodiment, client computing device 104 is a mobile computing device such as a smart phone or a tablet computing device. However, any other suitable type of computing device capable of communicating via the network and presenting a user interface may be used, including but not limited to a desktop computing device, a laptop computing device, a smart speaker, or a smart watch (or combinations of such devices).

Illustrative features and functionality of remote computer system 110 will now be described. Remote computer system 110 includes one or more server computers that implement the illustrated features, e.g., in a cloud computing arrangement. As illustrated in FIG. 1, the remote computer system 110 includes style recommendation engine 112, product/style data store 120, and user profile data store 122. Style recommendation engine 112 generates style recommendations, which can then be transmitted to, e.g., client computing device 104 and/or hair coloring device 102 in the form of a style profile. The style profile may include, for example, programmatic instructions for programming or configuring hair coloring device 102 in a particular way to achieve a particular look that is requested by the user and/or recommended by style recommendation engine 112. Style recommendations may further include product recommendations, tutorials, or other information.

In an embodiment, style recommendation engine 112 generates a style profile based on information received from product/style data store 120 along with user information from user profile data store 122, hair coloring device 102, client computing device 104, or a combination thereof, or from some other source or combination of sources. In an embodiment, style recommendation engine 112 receives a request for a new or updated style recommendation from hair coloring device 102 or client computing device 104, obtains information from product/style data store 120 (e.g., available settings and configurations for hair coloring device 102, available formulations or attachments, etc.), user profile data store 122 (e.g., users' answers to questions about themselves, device usage data, preferred hair colors or styles, location, age, products used, etc.), or client computing device 104 (e.g., information describing the user's current location, satisfaction with previous routines (indicated by e.g., star rating or number rating), etc.), and uses this information to perform further processing. In an embodiment, style recommendation engine 112 uses information it obtains to, e.g., generate a style profile or update a previously defined style profile.

Style recommendation engine 112 may employ machine learning or artificial intelligence techniques (e.g., template matching, feature extraction and matching, classification, artificial neural networks, deep learning architectures, genetic algorithms, or the like). In an embodiment, to generate a custom style recommendation, style recommendation engine 112 may analyze image data or other sensor data to determine, e.g., color, length, texture, porosity, etc., of the user's hair. In such a scenario, style recommendation engine 112 may use such information to generate or modify a style recommendation that suits the particular features of the user's hair.

Described embodiments allow for different machine learning approaches, or combinations of approaches, to be employed. In an illustrative scenario, style recommendation engine 112 includes a first machine learning model for determining characteristics of the user's hair. The first machine learning model may be trained on a set of supervised training data comprising image data and/or other sensor data, as image data or other sensor data of hair of other users. For example, a first machine learning model may be trained to take extracted images of a user's hair as input and to output an estimated hair color based on training images of the hair of other users. A second machine learning model may be used to generate recommendations based on self-reported or automatically determined hair characteristics. For example, the second machine learning model may take estimated hair color as input and output recommended styles or hair colors as output. The second machine learning model may take other parameters of the user's hair as input, as well, such as length, texture, or porosity. Such parameters may be automatically detected or self-reported. In addition, the second machine learning model may take user preference information, trending style information, or other information as input to generate a style recommendation.

In some embodiments, the machine learning models are neural networks, including but not limited to feedforward neural networks, convolutional neural networks (CNNs), recurrent neural networks, and generative adversarial networks (GANs). In some embodiments, any suitable training technique may be used, including but not limited to gradient descent, which may include stochastic, batch, and mini-batch gradient descent.

In an embodiment, location information may be used to look up and obtain other information which may be relevant to a hair coloring routine. For example, client computing device 104 may obtain location information (e.g., via a Global Positioning System (GPS) unit) to a remote computer system 110, which may in turn obtain current environmental data (e.g., humidity information, temperature information, etc.) for the respective location. The remote computer system 110 may then use the environmental data to generate or modify a hair coloring routine. In an illustrative scenario, the remote computer system 110 uses location information to determine that the user is in a hot, humid city, and modifies a hair coloring routine to account for this environment.

Figure 2:
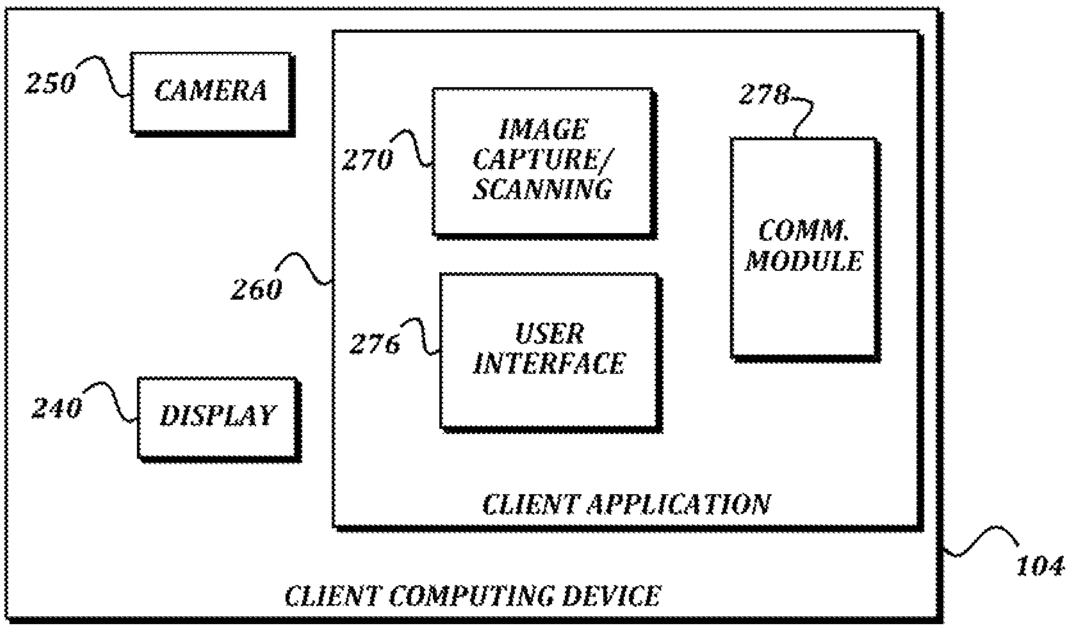
FIG. 2 is a block diagram that illustrates an example embodiment of a client computing device according to various aspects of the present disclosure.

FIG. 2 is a block diagram that illustrates an example embodiment of a client computing device 104 according to various aspects of the present disclosure. FIG. 2 depicts a non-limiting example of client computing device features and configurations; many other features and configurations are possible within the scope of the present disclosure.

In the example shown in FIG. 2, the client computing device 104 includes a camera 250 and a client application 260. The client application 260 includes a user interface 276, which may include interactive functionality such as data collection or questionnaire elements, tools for entering or editing user preferences, tutorials, virtual "try-on" functionality for virtually testing different hair colors or styles, or other elements. Visual elements of the user interface 276 are presented on a display 240, such as a touchscreen display. Customized content, such as style recommendations, may be obtained by the client computing device 104 (e.g., from the remote computer system 110) and presented via the user interface 276.

In an embodiment, the client application 260 also includes an image capture/scanning module 270, which is configured to capture and process digital images of the user's hair. In an embodiment, these digital images are transmitted to remote computer system 110 for further processing, such as for determination of hair color, length, texture, or other characteristics. In an embodiment, the user interface 276 includes user interface elements to assist in accurately capturing the digital images, such as by alerting a user when a lighting environment is too dark to accurately capture images for determining hair color.

In an embodiment, communication module 278 is used to prepare information for transmission to, or to receive and interpret information from other devices or systems, such as remote computer system 110 or hair coloring device 102. Such information may include captured digital images, scans, or video, device settings, user preferences, user identifiers, device identifiers, or the like.

Other features of client computing devices are not shown in FIG. 2 for ease of illustration. A description of illustrative computing devices is provided below with reference to FIG. 5.

Figure 3:
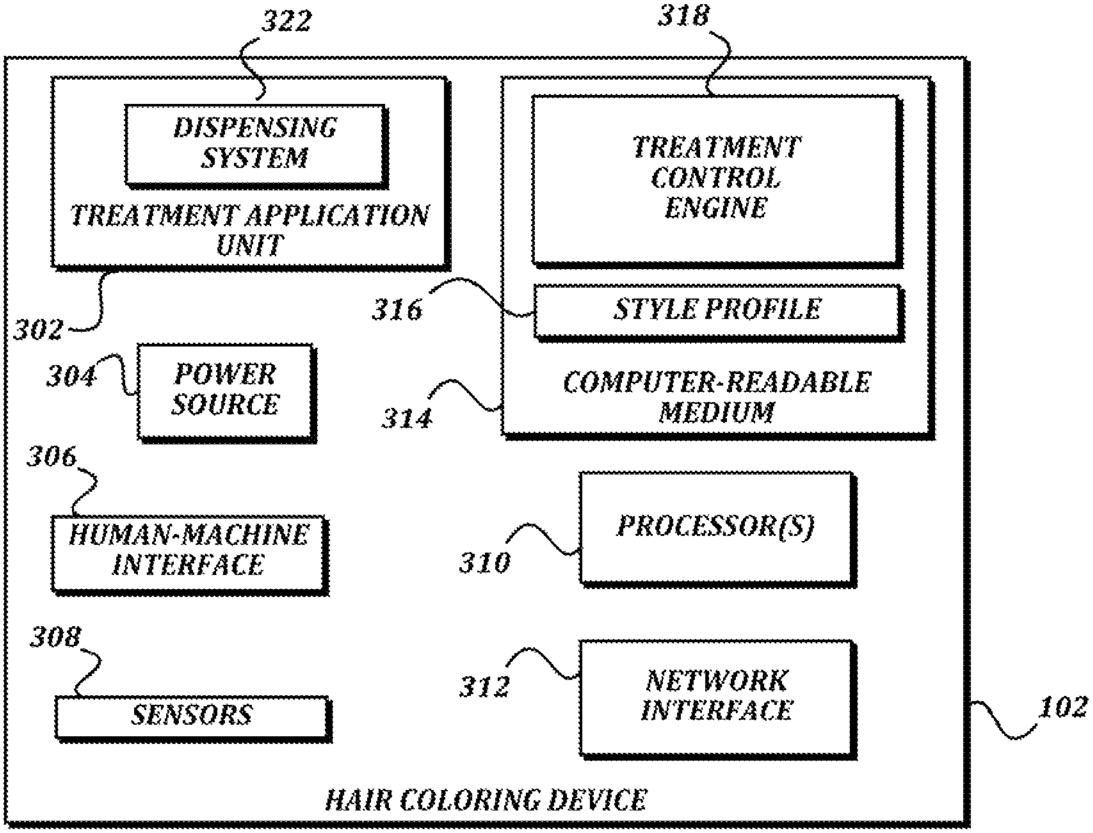
FIG. 3 is a block diagram that illustrates an example embodiment hair coloring device according to various aspects of the present disclosure.

FIG. 3 is a block diagram that illustrates an example embodiment hair coloring device 102 according to various aspects of the present disclosure. FIG. 3 depicts a non-limiting example of hair coloring device 102 features and configurations; many other features and configurations are possible within the scope of the present disclosure.

In the example shown in FIG. 3, hair coloring device 102 includes treatment application unit 302 configured to apply a hair coloring treatment to a user's hair, power source 304, human-machine interface device 306, sensors 308, processor 310, network interface 312, and computer-readable medium 314. In an embodiment, treatment application unit 302 includes a dispensing system 322, which includes one or more devices that collectively dispense a hair coloring treatment to be applied to a user's hair.

In an embodiment, power source 304 is a rechargeable battery that provides power to treatment application unit 302 and other components of hair coloring device 102 for operation. In other embodiments, instead of a battery, hair coloring device 102 may be coupled to an external power source, such as an electrical outlet.

The human-machine interface (HMI) 306 may include any type of device capable of receiving user input or generating output for presentation to a user. Non-limiting examples of possible features of the HMI 306 include a push-button switch, a toggle switch, a capacitive switch, a rotary switch, a slide switch, a rocker switch, and a touch screen.

Processor 310 is configured to execute computer-executable instructions stored on computer-readable medium 314. In an embodiment, processor 310 is configured to receive and transmit signals to and/or from other components of hair coloring device 102 via a communication bus or other circuitry. Network interface 312 is configured to transmit and receive signals to and from client computing device 104 (or other computing devices) on behalf of processor 310. Network interface 312 may implement any suitable communication technology, including but not limited to short-range wireless technologies such as Bluetooth®, infrared, near-field communication (NFC), and Wi-Fi; long-range wireless technologies such as WiMAX, 2G, 3G, 4G, LTE, and 5G; and wired technologies such as Universal Serial Bus (USB), FireWire, and Ethernet. Computer-readable medium 314 is any type of computer-readable medium on which computer-executable instructions may be stored, including but not limited to a flash memory, a read-only memory (ROM), an erasable programmable read-only memory (EPROM), an electrically erasable programmable read-only memory (EEPROM), and a field-programmable gate array (FPGA). Computer-readable medium 314 and processor 310 may be combined into a single device, such as an application-specific integrated circuit (ASIC), or the computer-readable medium 314 may include a cache memory, a register, or another component of the processor 310.

In the illustrated embodiment, computer-readable medium 314 has computer-executable instructions stored thereon that, in response to execution by one or more processors 310, cause hair coloring device 102 to obtain style profile 316 and implement treatment control engine 318. Treatment control engine 318 controls one or more aspects of hair coloring device 102. In an embodiment, style profile 316 is generated and/or modified by style recommendation engine 112.

In an embodiment, treatment control engine 318 adjusts settings or configurations for hair coloring device 102. In an illustrative scenario, treatment control engine 318 obtains information such as recommended hair color patterns and coloring formulation components from style profile 316, and transmits corresponding control instructions to treatment application unit 302. In such a scenario, the control instructions may be used to control the dispensing of coloring formulation components from dispensing system 322, such as by activating or deactivating the dispensing of one or more components of the coloring formulation or adjusting flow rates of such components, e.g., to modulate dye loads.

In an embodiment, treatment control engine 318 detects input from HMI 306 and activates treatment application unit 302 or otherwise modifies a function of hair coloring device 102 in response to the input. The treatment control engine 318 may then detect a subsequent input from the HMI 306 and deactivate treatment application unit 302 or make further adjustments to the function of hair coloring device 102 in response.

In an embodiment, sensors 308 include a position sensor module (e.g., a two-dimensional (2D) or three-dimensional (3D) camera module, a proximity sensor, a gyroscope, an accelerometer, or a combination thereof) configured to obtain position sensor data for calculating a position of hair coloring device 102. Alternatively, position can be calculated based on images captured by one or more cameras positioned at a distance from the applicator, such that the images capture both hair coloring device 102 itself and the part of the hair on which hair coloring device 102 is located. Sensors such as accelerometers also may be used to calculate orientation or velocity of hair coloring device 102 as it moves through the user's hair. In some embodiments, sensors 308 include a microscope camera to capture magnified images of the user's hair or scalp. Capture of images may be aided by illumination provided by one or more light sources, such as light sources positioned on hair coloring device 102. Such images may be captured in, e.g., the visible, infrared, or ultraviolet spectrum, or a combination thereof.

In an embodiment, information obtained from sensors 308 is provided as feedback to treatment control engine 318 or to some other component or device in order to adjust operational parameters of hair coloring device 102. For example, if sensors 308 indicate that the velocity of hair coloring device 102 is faster than expected, treatment control engine 318 may send instructions to treatment application unit 302 to adjust component flow rates to account for the faster movement, or treatment control engine 318 may cause hair coloring device 102 to provide feedback to a user to slow down the movement, such as via a graphical or text notification presented on a display of client computing device 104. An illustrative embodiment of hair coloring device 102 will now be described in greater detail. In the illustrative embodiment, dispensing system 322 includes a plurality of nozzles for applying a coloring formulation (e.g., dye, developer, or a combination thereof) to the hair and/or scalp tissue of a user. Examples of treatment formulations applied by the embodiments herein include: permanent hair dye; semi-permanent hair dye; developer; conditioner; hair protein treatment; disulfide bond repairing hair treatment; fluid hair treatment; fluid scalp treatment, and the like. The nozzles include outlet apertures through which coloring formulation may be discharged. If using a developer or multiple colors of dye, prior to discharge of the coloring formulation through the outlet apertures, the components are mixed together. The nozzles may move during use, for example, by reciprocating or oscillating motion, such that the nozzles can deliver more thorough coverage of the coloring formulation. In the illustrative embodiment, HMI 306 includes a control button configured for the activating, deactivating, and controlling features of the hair coloring device 102. Pressing the control button powers on the hair coloring device 102 such that coloring formulation may be drawn from formulation containers housed within the hair coloring device 102 and discharged from the nozzles in a controlled manner. In certain situations, the control button or other features of HMI 106 may be used to initialize or place hair coloring device 102 in a state to perform certain functions, or such functions may be automatically controlled, such as by treatment control engine 318. Such functions may include calculating a mixture ratio of the components of the coloring formulation, such as dyes and developer; adjusting flow rates of the components; adjusting nozzle oscillation or reciprocating motion rates, or other movements; entering a cleaning or purging mode; heating the formulation; gathering data from the formulation containers, such as volume remaining, mixture ratios, color information, etc.; analyzing data regarding user preferences; gathering data from sensors; and providing status indication to the user, such as power output level, battery life, formulation volume remaining, sensor data, data connection information, etc.

The devices shown in FIGS. 1-3 or other devices used in described embodiments may communicate with each other via a network (not shown), which may include any suitable communication technology including but not limited to wired technologies such as DSL, Ethernet, fiber optic, USB, and Firewire; wireless technologies such as WiFi, WiMAX, 3G, 4G, LTE, 5G, and Bluetooth®; and the Internet. In general, communication between the components of the systems in FIG. 1 or other computing devices may occur directly or through intermediate devices.

Many alternatives to the arrangement disclosed and described with reference to FIGS. 1-3 are possible. For example, functionality described as being implemented in multiple components may instead be consolidated into a single component, or functionality described as being implemented in a single component may be implemented in multiple illustrated components, or in other components that are not shown in FIGS. 1-3. As another example, devices in FIGS. 1-3 that are illustrated as including particular components may instead include more components, fewer components, or different components without departing from the scope of described embodiments.

Within components of the system depicting in FIG. 1 or devices depicted in FIGS. 2 and 3 or by components of such systems and devices working in combination, numerous technical benefits are achieved. For example, the ability to automatically generate or modify hair style recommendations based on digital scans of a user's hair, either alone or in combination with additional data such as user data and environmental data, overcomes technical limitations of prior technologies that depended on user's abilities to configure their own devices. As another example, the system 100 allows some aspects of the process to be conducted independently by hair coloring devices or client computing devices, while moving other processing burdens to the remote computer system 110 (which may be a relatively high-powered and reliable computing system), thus improving performance and preserving battery life for functionality provided by hair coloring devices or client computing devices.

In general, the word "engine," as used herein, refers to logic embodied in hardware or software instructions written in a programming language, such as C, C++, COBOL, JAVA™, PHP, Perl, HTML, CSS, Javascript, VBScript, ASPX, Microsoft.NET™, and/or the like. An engine may be compiled into executable programs or written in interpreted programming languages. Software engines may be callable from other engines or from themselves. Generally, the engines described herein refer to logical modules that can be merged with other engines or divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Figure 4:
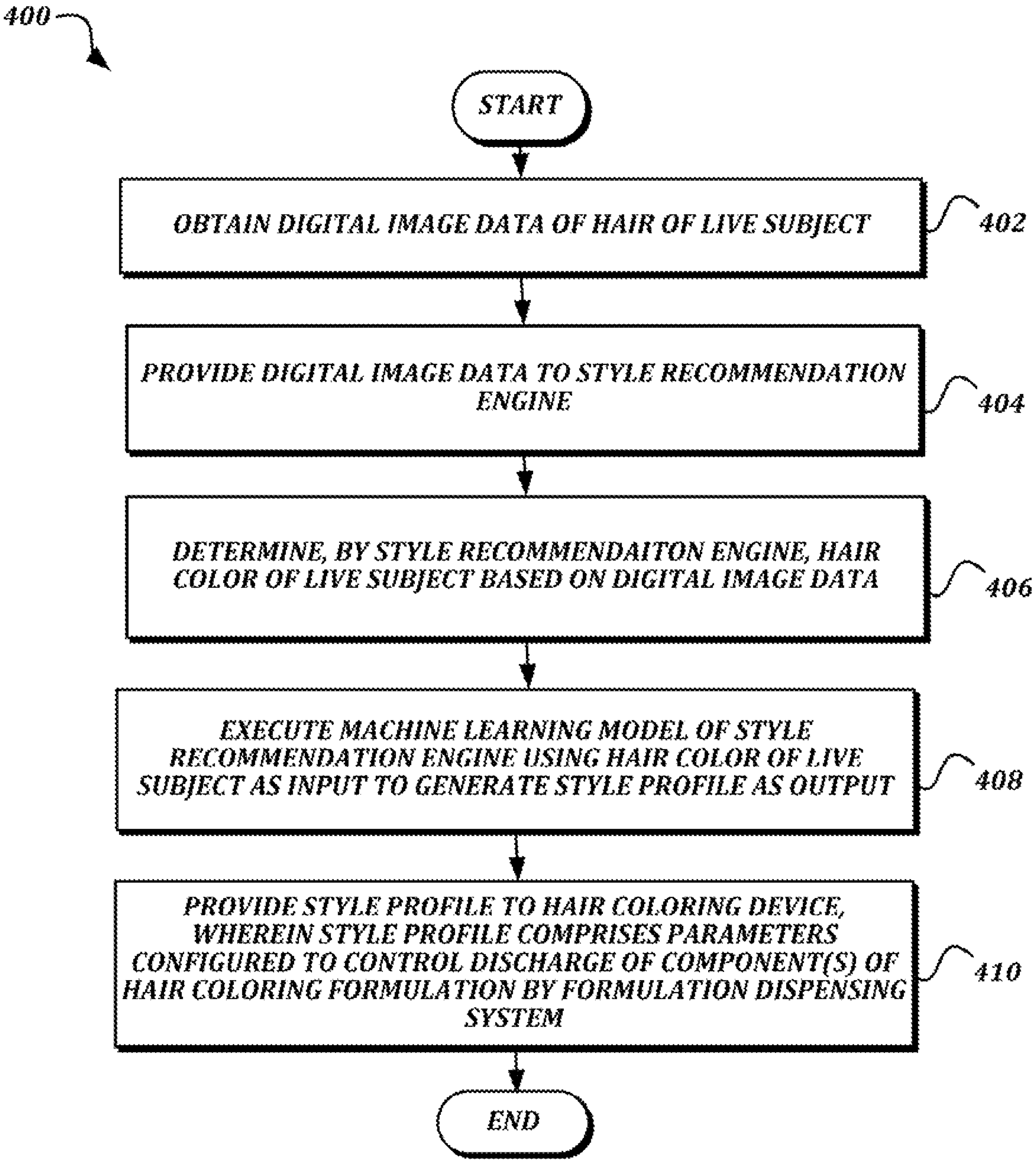
FIG. 4 is a flowchart that illustrates an example embodiment of a method of generating a style profile for a hair coloring device.

FIG. 4 is a flowchart that illustrates an example embodiment of a method of generating a style profile for a hair coloring device. As illustrated, the method 400 is implemented by a computer system. The method 400 may be implemented by a server computer system including features of remote computer system 110, by client computing device 104, by hair coloring device 102, or a combination thereof, or by some other computing device or system.

From a start block, the method 400 proceeds to block 402, where the computer system obtains digital image data of hair of a live subject. In an embodiment, the computer system includes a server computer that obtains one or more digital images from a client device, such as a smart phone with an integrated digital camera. In such an embodiment, these images are captured by the client device and uploaded to the server computer.

The method 400 proceeds to block 404, where the computer system provides digital image data of the hair of the live subject to a style recommendation engine of the computer system. In an embodiment, the digital image data is uploaded by a client computing device that captured the digital image data to a remote computer system that implements the style recommendation engine. Alternatively, the style recommendation engine is implemented by the client computing device or by some other computing device or system.

The method proceeds to step 406, where the style recommendation engine determines hair color of the live subject based on the digital image data. In an embodiment, determining the hair color includes executing a machine learning model of the style recommendation engine using the digital image data as input to generate the hair color as output.

The method proceeds to step 408, where the computer system executes a machine learning model of the style recommendation engine using the determined hair color of the live subject as input to generate a style profile as output. Additional information may also be used as inputs to generate the style profile. In an embodiment, the computer system determines length or texture of the hair of the live subject (or obtains information about the length and texture in some other way, such as via a user questionnaire), and the executing of the machine learning model uses the length or texture of the hair as additional input to generate the style profile as output.

The method proceeds to step 410, where the computer system provides the style profile to a hair coloring device.

The style profile comprises parameters configured to control discharge of one or more components of a hair coloring formulation by a formulation dispensing system of the hair coloring device. In an embodiment, the hair coloring device includes computational circuitry configured to receive the style profile and operate the formulation dispensing system according to the style profile, such as by activating or modulating discharge of the component(s) of the hair coloring formulation based on information in the style profile.

In an embodiment, the style profile generated by the machine learning model further comprises a pattern of hair coloring, and the parameters are further configured to modulate discharge of the one or more components to color the hair of the live subject according to the pattern, such as by varying fluid flow rates to achieve a color gradient effect.

In an embodiment, the style profile generated by the machine learning model further comprises one or more custom components (e.g., dyes or developer) of the hair coloring formulation. In illustrative scenario, the machine learning model uses the hair color of the live subject (potentially along with other hair characteristics, such as length, texture, or porosity) as input to select one or more custom components of the hair coloring formulation, such a custom dye or blend of dyes.

In an embodiment, the computer system obtains environmental data associated with the environment of the live subject (e.g., temperature data, humidity data, or a combination thereof), and the executing of the machine learning model uses the environmental data as additional input to generate the style profile as output. For example, because the effect of hair coloring treatments on a user's hair can vary based on air temperature and humidity, environmental data may be used as inputs to determine, e.g., custom coloring components, flow rates, or the like.

In an embodiment, the computer system obtains sensor information from the hair coloring device during a hair coloring operation and modifies the discharge of one or more of the components based on the sensor information. In an illustrative scenario, the sensor information comprises position sensor data, and the modification of the discharge of the component(s) includes calculating, based on the position sensor data, a position of the hair coloring device relative to the hair of the live subject, and modifying the discharge of the component(s) based on the calculated position.

Figure 5:
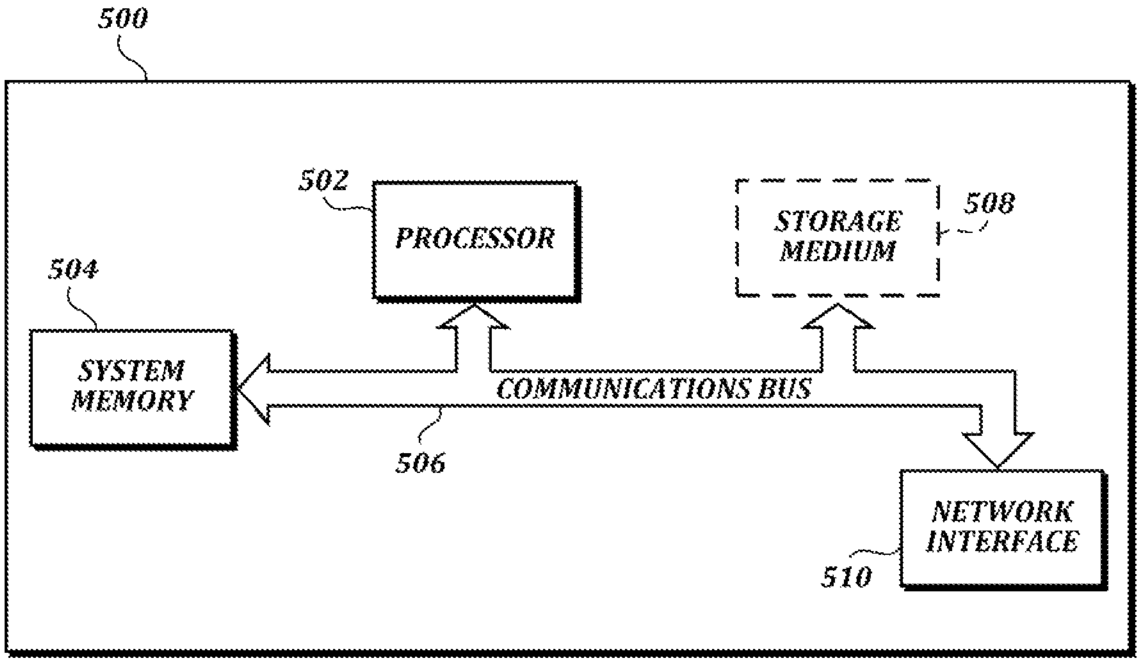
FIG. 5 is a block diagram that illustrates aspects of an exemplary computing device appropriate for use as a computing device of the present disclosure.

FIG. 5 is a block diagram that illustrates aspects of an exemplary computing device 500 appropriate for use as a computing device of the present disclosure. While multiple different types of computing devices were discussed above, the exemplary computing device 500 describes various elements that are common to many different types of computing devices. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, 4G, LTE, 5G, WiMAX, Bluetooth, Bluetooth low energy, and/or the like. As will be appreciated by one of ordinary skill in the art, the network interface 510 illustrated in FIG. 5 may represent one or more wireless interfaces or physical communication interfaces described and illustrated above with respect to particular components of the system 100.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, digital versatile disk (DVD), or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are examples of computer-readable media.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including radio frequency (RF), infrared, serial, parallel, Bluetooth®, Bluetooth® low energy, USB, or other suitable connections protocols using wireless or physical connections. Similarly, the computing device 500 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A non-transitory computer-readable medium having stored thereon instructions configured to, when executed by one or more computing devices of a computer system, cause the computer system to perform operations comprising:
obtaining digital image data of hair of a live subject;
providing the digital image data to a style recommendation engine of the computer system;
determining, by the style recommendation engine of the computer system, color of the hair of the live subject based on the digital image data; and
executing a machine learning model of the style recommendation engine using the color of the hair of the live subject as input to generate a style profile as output,
wherein the style profile comprises parameters configured to control discharge of one or more components of a hair coloring formulation by a formulation dispensing system of a hair coloring device,
wherein the style profile generated by the machine learning model further comprises a pattern of hair coloring, wherein the pattern comprises a gradient effect, and wherein the parameters are further configured to modulate discharge of the one or more components to color the hair of the live subject to achieve the gradient effect.

2. The non-transitory computer-readable medium of claim 1, wherein the style profile generated by the machine learning model further comprises one or more custom components of the hair coloring formulation.

3. The computer-readable medium of claim 1, the operations further comprising determining length or texture of the hair of the live subject, wherein the executing of the machine learning model uses the length or texture of the hair as additional input to generate the style profile as output.

4. The computer-readable medium of claim 1, the operations further comprising obtaining environmental data associated with the environment of the live subject, wherein the executing of the machine learning model uses the environmental data as additional input to generate the style profile as output.

5. The computer-readable medium of claim 4, wherein the environmental data includes temperature data, humidity data, or a combination thereof.

6. The computer-readable medium of claim 1, the operations further comprising:
obtaining sensor information from the hair coloring device during a hair coloring operation; and
modifying the discharge of the one or more components based on the sensor information.

7. The computer-readable medium of claim 6, wherein the sensor information comprises position sensor data, and wherein modifying the discharge of the one or more components based on the sensor information comprises:
calculating, based on the position sensor data, a position of the hair coloring device relative to the hair of the live subject; and
modifying the discharge of the one or more components based on the calculated position.

8. The computer-readable medium of claim 1, wherein determining the color of the hair of the live subject based on the digital image data comprises:
executing a machine learning model of the style recommendation engine using the digital image data as input to generate the determined color of the hair as output.

9. A computer-implemented method executed by one or more computing devices of a computer system, the method comprising:
obtaining digital image data of hair of a live subject;
providing the digital image data to a style recommendation engine of the computer system;
determining, by the style recommendation engine of the computer system, color of the hair of the live subject based on the digital image data; and
executing a machine learning model of the style recommendation engine using the color of the hair of the live subject as input to generate a style profile as output,
and wherein the style profile comprises parameters configured to control discharge of one or more components of a hair coloring formulation by a formulation dispensing system of a hair coloring device,
wherein the style profile generated by the machine learning model further comprises a pattern of hair coloring, wherein the pattern comprises a gradient effect, and wherein the parameters are further configured to modulate discharge of the one or more components to color the hair of the live subject to achieve the gradient effect.

10. The method of claim 9, wherein the style profile generated by the machine learning model comprises one or more custom components of the hair coloring formulation.

11. The method of claim 9 further comprising determining length or texture of the hair of the live subject, wherein the executing of the machine learning model uses the length or texture of the hair as additional input to generate the style profile as output.

12. The method of claim 9 further comprising obtaining environmental data associated with the environment of the live subject, wherein the executing of the machine learning model uses the environmental data as additional input to generate the style profile as output.

13. The method of claim 12, wherein the environmental data includes temperature data, humidity data, or a combination thereof.

14. The method of claim 9 further comprising:
obtaining sensor information from the hair coloring device during a hair coloring operation; and
modifying the discharge of the one or more components of the hair coloring formulation based on the sensor information.

15. The method of claim 14, wherein the sensor information comprises position sensor data, and wherein modifying the discharge of the one or more components based on the sensor information comprises:
calculating, based on the position sensor data, a position of the hair coloring device relative to the hair of the live subject; and
modifying the discharge of the one or more components of the hair coloring formulation based on the calculated position.

16. The method of claim 9, wherein determining the color of the hair of the live subject based on the digital image data comprises:
executing a machine learning model of the style recommendation engine using the digital image data as input to generate the determined color of the hair as output.

17. A hair coloring device, comprising:
a formulation dispensing system; and
computational circuitry configured to:
receive a style profile comprising parameters configured to control discharge of one or more components of a hair coloring formulation by the formulation dispensing system; and
operate the formulation dispensing system according to the style profile, wherein the style profile is generated as output of a machine learning model of a style recommendation engine, wherein the style profile generated by the machine learning model further comprises a pattern of hair coloring, wherein the pattern comprises a gradient effect, and wherein the parameters are further configured to modulate discharge of the one or more components to color the hair of the live subject to achieve the gradient effect.

18. The hair coloring device of claim 17 further comprising one or more sensors, wherein the computational circuitry is further configured to:

obtain sensor information from the one or more sensors during a hair coloring operation; and modulate the discharge of the one or more components of the hair coloring formulation based on the sensor information.

19. The hair coloring device of claim 17, wherein the parameters are further configured to cause the formulation dispensing system to gradually increase or decrease dye loads along the length of the hair to achieve the gradient effect.

20. The hair coloring device of claim 19, wherein the pattern of hair coloring comprises balayage styling.

* * * * *